W. I. WHEELER.
POWER TRANSMISSION MECHANISM.
APPLICATION FILED AUG. 7, 1920. RENEWED JAN. 7, 1922.
1,422,509.
Patented July 11, 1922.
3 SHEETS—SHEET 1.
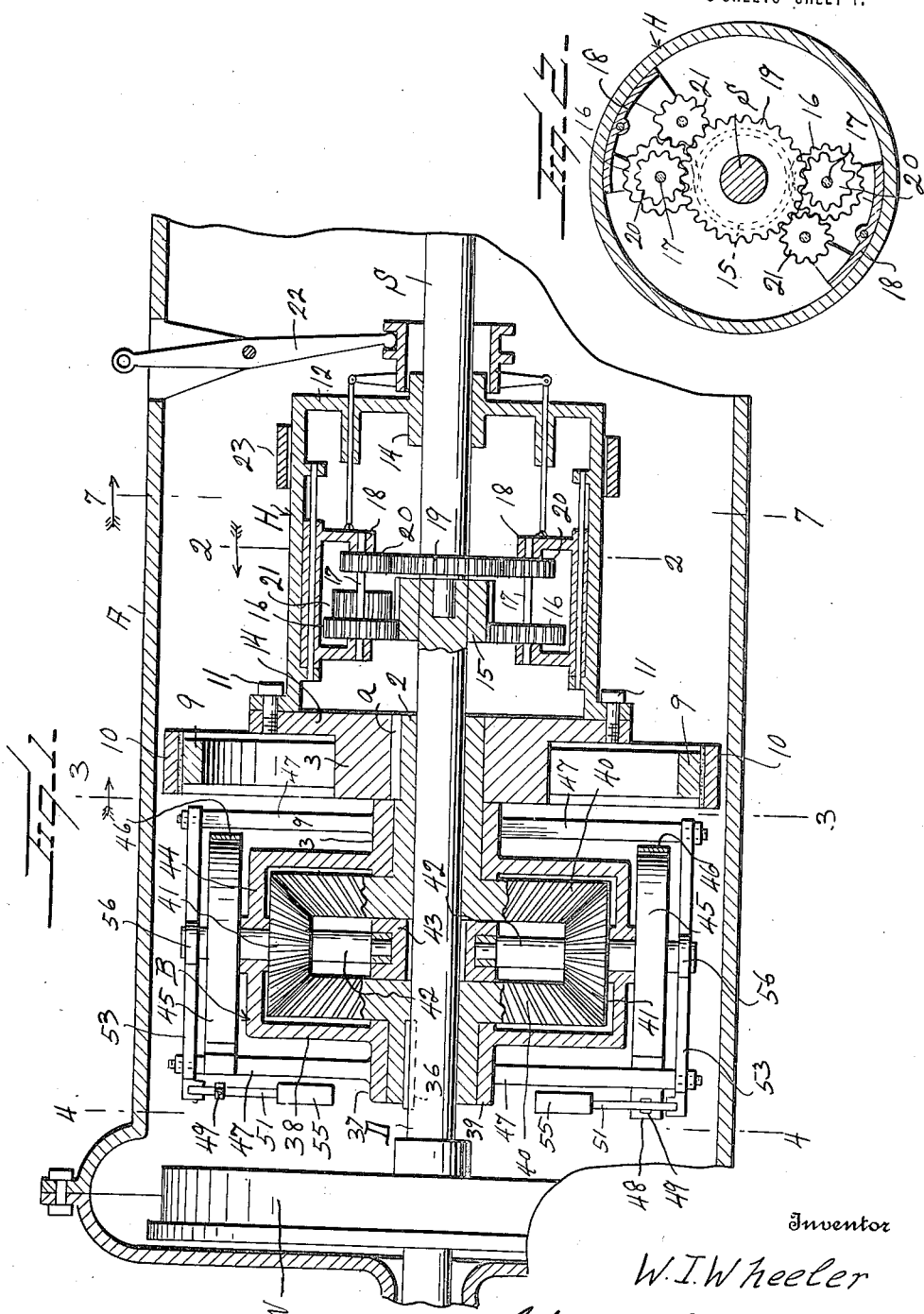
Inventor
W. I. Wheeler
By Watson E. Coleman
Attorney

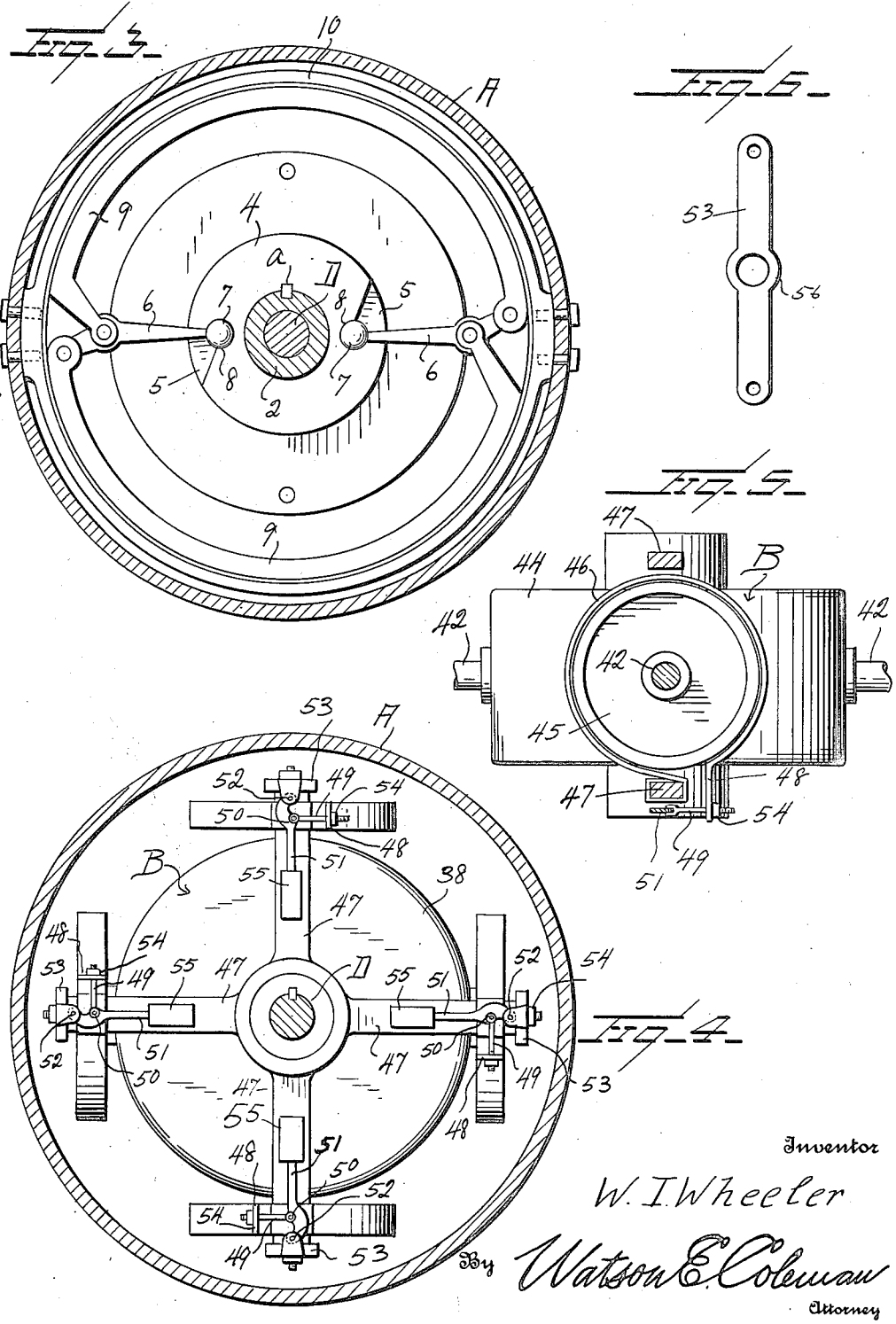

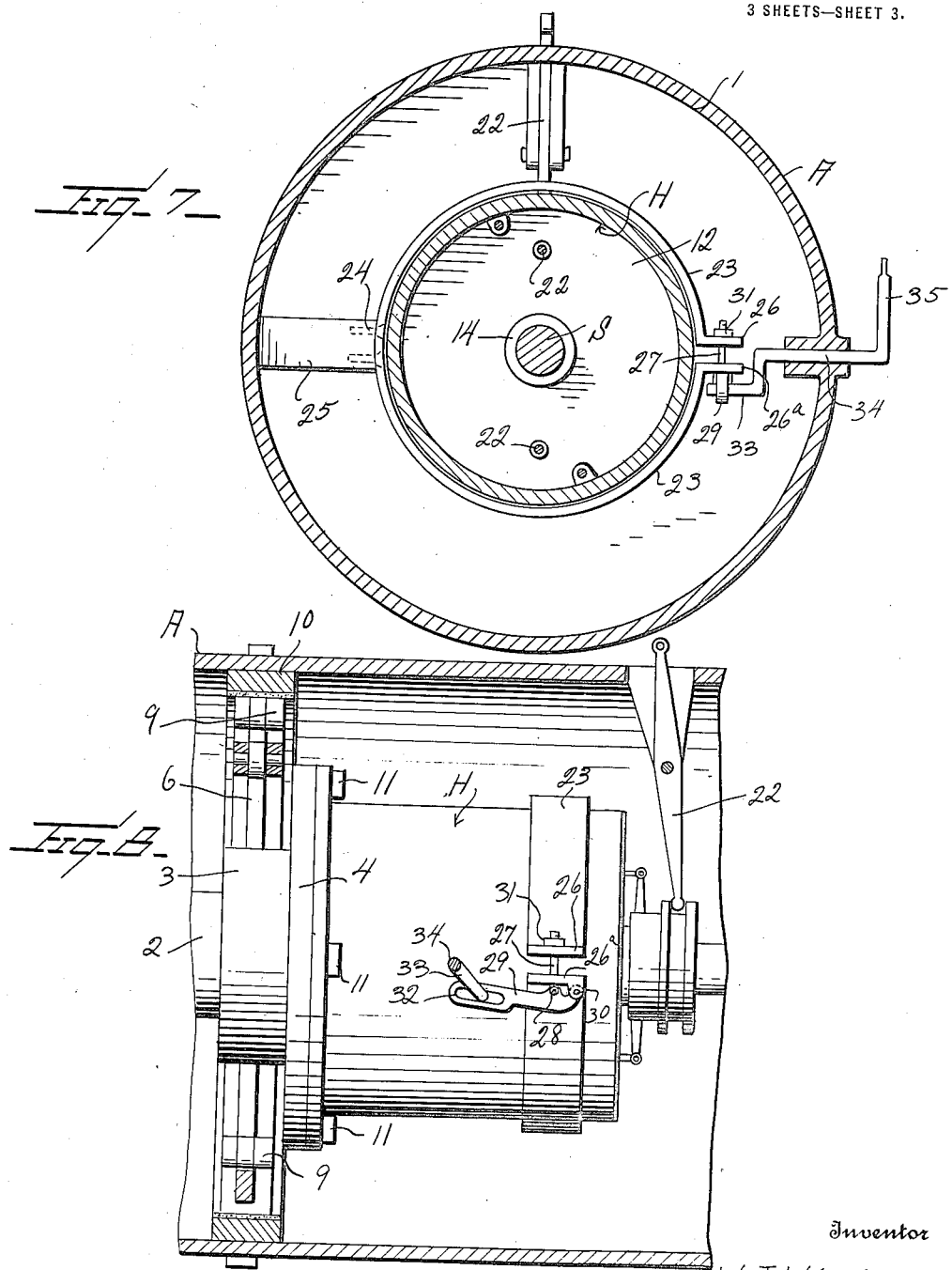

UNITED STATES PATENT OFFICE.

WILLIAM I. WHEELER, OF SCOTTVILLE, ILLINOIS.

POWER-TRANSMISSION MECHANISM.

1,422,509. Specification of Letters Patent. Patented July 11, 1922.

Application filed August 7, 1920, Serial No. 401,892. Renewed January 7, 1922. Serial No. 527,764.

*To all whom it may concern:*

Be it known that I, WILLIAM I. WHEELER, a citizen of the United States, residing at Scottville, in the county of Macoupin and State of Illinois, have invented certain new and useful Improvements in Power-Transmission Mechanisms, of which the following is a specification, reference being had to the accompanying drawings.

This invention relates to certain improvements in power transmission mechanisms, and it is an object of the invention to provide a novel and improved mechanism of this general character wherein the speed of the driven shaft with respect to the driving shaft is automatically controlled and particularly in accordance with the engine load.

Another object of the invention is to provide a novel and improved mechanism of this general character embodying an operative connection between the driving and driven shaft including a member loosely mounted on the shafts, together with means for holding said member against rotation in one direction in unison with the shafts together with a clutching means rotating with one of said shafts and automatically operating to engage the member to cause the same to rotate in one direction in unison with the shafts.

An additional object of the invention is to provide a novel and improved mechanism of this general character wherein the member or housing comprised in the operative connection between the driving and driven shafts has coacting therewith a clutching means which, when in applied position, causes said member and shafts to rotate in unison and wherein said clutching means embodies a plurality of separable units each of which, when in gripping engagement with the member, is insufficient in itself to cause said member to rotate in unison with the shafts.

Furthermore, it is an object of the invention to provide a novel and improved mechanism of this general character wherein the clutching means for engaging the member or housing comprised in the operative connection between the driving and driven shafts from becoming unduly heated or worn.

A still further object of the invention is to provide a novel and improved mechanism of this general character wherein the clutching means engageable with the member or housing comprised in the operative connection between the driving and driven shafts consists of a plurality of separable units of a number sufficient to effect the requisite locking or holding of the housing or member when all of the units are in applied position but wherein a single unit in itself is insufficient to effect the requisite holding or locking of the housing or member.

It is also an object of the invention to provide a novel and improved mechanism of this general character including a member or housing comprised in the operative connection between the driving and driven shafts and wherein a clutching means coacts with said member or housing to lock or hold the same for rotation in unison with the shafts, said clutching means embodying a plurality of separable units so constructed and arranged to permit slipping of the member or housing without overheating the clutching units or imposing undue strain thereon and which slipping of the member or housing will occur before the units comprised in the clutching mechanism have engaged said member or housing in a manner to positively lock or hold the same for unitary rotation with the shafts and which provision permits a variation of speed of the driven shaft.

The invention consists in the details of construction and in the combination and arrangement of the several parts of my improved power transmission mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in longitudinal section and partly in side elevation of a transmission mechanism constructed in accordance with an embodiment of my invention.

Figure 2 is a sectional view taken substantially on the line 2—2 of Figure 1, looking in the direction of the arrow.

Figure 3 is a sectional view taken substantially on the line 3—3 of Figure 1, looking in the direction of the arrow.

Figure 4 is a sectional view taken substantially on the line 4—4 of Figure 1.

Figure 5 is a fragmentary view partly in top plan and partly in section illustrating certain details of the automatically operating clutching means herein embodied.

Figure 6 is a view in top plan of a holding bar comprised in each of the units of the clutching means.

Figure 7 is a sectional view taken substantially on the line 7—7 of Figure 1, looking in the direction of the arrow, and Figure 8 is a fragmentary view partly in longitudinal section and partly in side elevation of the structure illustrated in Figure 7.

As disclosed in the accompanying drawings, D denotes a driving shaft of a motor supported in a conventional manner and which has mounted thereon a fly wheel W, said wheel W being arranged within an enlarged end portion of an elongated and substantially cylindrical housing or casing A. The housing or casing A has the end thereof remote from the wheel W permanently closed by the head or wall 1 as is well known.

The inserted end portion of the shaft D is operatively engaged with an inserted end portion of the driven shaft S, said shaft S being in longitudinal alinement with the shaft D and extending exteriorly of the housing or casing A through the closed end or head 1 thereof.

Loosely mounted upon the shaft D within the housing or casing A is an elongated hub or sleeve 2 of requisite diameter and keyed or otherwise fixed to an end portion thereof, as at $a$, is a hub 3 having its peripheral portion at one end defined by an outstanding plate 4. At diametrically opposed points the periphery of the hub 3 is provided with sockets 5 from which extend the links 6. The inner ends of the links are provided with the balls 7 seating in the supplemental sockets 8 so that the links 6 will be carried in a substantially radial position when the hub 3 rotates in one direction but will be automatically shifted to a position inclined to the radial when the hub 3 is shifted in the opposite direction.

Each of the links 6 is pivotally connected to the adjacent end portions of the friction band or brake sections 9 and, as is particularly illustrated in Figure 3, it is to be noted that one end of each band or brake section is pivoted inwardly of the adjacent end of the second band or brake section and that there is sufficient space between the band or brake sections to permit the same to rock. The links 6 operate as toggle links so that when the hub 3 is rotated in one direction the band or brake sections 9 will be expanded and when rotated in the opposite direction said band or brake sections will be contracted. When the sections 9 are expanded they frictionally engage the annular flange 10 arranged within the casing or housing A and carried by the wall thereof, said flange 10 being concentric to the hub 3.

The general construction and arrangement of the clutch mechanism just described is substantially the same as a similar structure embodied and claimed in my pending application Serial No. 293,200, filed April 28, 1919.

Bolted or otherwise secured, as at 11, to the peripheral portion of the plate 4 and extending toward and partially surrounding the inserted end portion of the driven shaft S is a housing or casing H. Said housing or casing H is preferably cylindrical in form so that the same may constitute a drum for a purpose to be hereinafter more particularly referred to.

The end portion of the housing or casing H remote from the hub 3 is closed by the end plate or head 12 preferably integral therewith and which is provided at its axial center with a hub 14 through which the driven shaft S is freely disposed. The housing or casing H, together with the plate 4 and hub 3, afford a member mounted upon both of the shafts D and S and in a manner whereby the shafts D and S and the member are capable of independent rotation or for rotation in unison in a manner which will now be described.

The inserted end extremity of the shaft D has fixed thereto a relatively broad gear 15. Meshing with the gear 15 are the diametrically opposed gears 16. Each of the gears 16 is fixed to a shaft 17 rotatably supported by a carriage 18. The carriage 18 is supported by the wall of the housing or casing H for sliding movement in a direction longitudinal of the shafts D and S.

The inserted end extremity of the shaft S has affixed thereto a gear 19 preferably of a greater radius than the gear 15. The gear 19 is in mesh with the gears 20, when the carriages are in one position, said gears 20 being each fixed to a shaft 17. By this means, the driving shaft D is operatively engaged with the driven shaft S and in a manner whereby the driven shaft S may be rotated at a speed less than the speed of the driving shaft D. The various gears just referred to may be of any desired ratios so that the ratio of speed between the driving shaft D and the driven shaft S may be as preferred.

Each of the carriages 18 is also provided with a relatively broad gear 21 constantly in mesh with a gear 16. When the carriages 18 are sufficiently moved in a direction inwardly of the shaft S, the gears 20 disengage from the gear 19 and the gears 21 are brought into mesh with the gear 19, resulting in a reverse rotation of the shaft S.

22 denotes an actuating mechanism for the carriages 18 and which mechanism may be operated in any desired manner. I wish it to be understood that it is not my purpose to limit the present embodiment of my invention to this particular arrangement of gears or reversing mechanism just described as any conventional mechanism may be substituted therefor. I wish to state, however, that this particular arrangement and combination of gears and reversing mechanism is claimed in my application executed on even date herewith and which is a division of my pending application Serial No. 360,955, filed February 24, 1920.

When it is desired to reverse the direction of rotation of the shaft S, the clutch band 23 is caused to frictionally engage the housing or casing H to positively hold said housing or casing H against rotation. As is particularly illustrated in Figures 7 and 8 of the accompanying drawings, the band 23 has its central portion operatively supported, as at 24, with an inwardly directed post or arm 25 carried by the casing or housing H and which post or arm 25 is preferably horizontally disposed. The opposite or free end portions of the band 23 are provided with outstanding ears or lugs 26 and 26$^a$ arranged substantially in parallelism.

Slidably disposed through the lugs or ears 26 and 26$^a$ is a shank 27 having one end portion pivotally engaged, as at 28, with an arm 29 extending in a direction longitudinally of the shaft S. The pivotal connection 28 is positioned inwardly of the pivotal connection 30 between an end portion of the arm 29 and the lug or ear 26$^a$. The end portion of the shank 27 remote from the arm 29 has threaded thereon an adjustable stop 31 which contacts with the outer face of the lug 26 so that upon imparting swinging movement to the arm 29 in one direction, the ears 26 and 26$^a$ will be drawn one toward the other so that the band 23 will be caused to have the requisite frictional or gripping action on the housing H.

The arm 29 may be rocked in any desired manner but, as herein disclosed, the outer or free end portion thereof is provided with a longitudinally disposed slot 32 in which is operatively engaged a crank 33 carried by the threaded end portion of a rock shaft 34. The rock shaft 34 is disposed through the wall of the casing or housing A and the exterior end portion thereof is provided with a rock arm 35 through which is adapted to be engaged a suitable mechanism whereby the desired rocking movement of the shaft 34 may be manually obtained.

Keyed, as at 36, to the shaft D at a point inwardly of the hub or sleeve 2 is a second hub or sleeve 37. B denotes a cylindrical casing having its end plates or heads 38 provided at the axial center thereof with the hubs or bearings 39 freely mounted on the sleeves or hubs 2 whereby the casing B and the hubs or sleeves 2 and 38 are capable of relative independent rotation.

Carried by the opposed ends of the sleeves or hubs 2 and positioned within the casing B are the beveled gears 40 and constantly in mesh with the gears 40 are the interposed idle beveled gears 41. The gears 41 are herein disclosed as four in number and equidistantly spaced in a direction circumferentially of the gears 40 and it is also of decided advantage and importance to have the gears 41 of a diameter less than the diameter of the gears 40 so that when the gears 41 are free to rotate they will have a greater peripheral speed than that of the peripheral speed of the gears 40.

Each of the gears 41 is fixed within the casing B to a shaft 42 radiating from a sleeve 43 loosely surrounding the shaft D and positioned between the opposed gears 40. The shaft 42 is of a length to extend exteriorly of the casing B through the peripheral wall 44 thereof. Fixed to the extended portion of each of the shafts 42 is a band or brake wheel 45 and with the periphery of which coacts a brake band 46 substantially surrounding said wheel 45.

Radiating from the hubs or bearings 39 are the posts 47 with each pair of posts alined longitudinally of the shaft D substantially in parallelism with each other and with a shaft 42. An end portion of a brake band 46 is secured to one of said posts while the opposite or free end portion of said band terminates in an outstanding ear or lug 48 through which is freely directed a shank 49. One end portion of the shank 49 is pivotally engaged, as at 50, with an arm 51 extending inwardly of an adjacent post 47 and having its outer end portion pivotally engaged, as at 52, with the adjacent end portion of a holding bar 53 connecting the outer ends of the adjacent pair of posts 47.

The opposite or outer end portion of the shank 49 has threaded thereon a stop member 54 contacting with the outer face of the lug or ear 48. The inner or free end portion of each of the arms 51 is provided with a weighted member 55 so that under the centrifugal force created by the rotation of the casing B, which occurs when the shaft S is running below high, the arms 51 will swing outwardly causing the various brake bands 46 to frictionally engage or grip their coacting wheels 45 whereby the casing or housing H will be caused to rotate in unison with the shafts D and S so that the speed of the driven shaft will be increased.

It is to be understood that the maximum of tension of each of the bands 46 upon its coacting wheel 45 is insufficient in itself to hold the housing or casing H and, of course, the casing B against independent movement relative to the gears 40 but the aggregate tension or resistance of all of the bands 46 is sufficient to accomplish this purpose. Each of the bars 53 is provided in its central portion with a bearing 56 in which is engaged the outer end portion of a shaft 42 but the particular purpose of each of the bars 53 is to provide means to prevent the adjacent brake band from moving upwardly into an inoperative position with respect to its coacting wheel 45.

As before stated, the gears 41 have a greater speed of rotation than the gears 40 and which results in an increased speed of the shafts 42 and a resultant high peripheral rotation of the wheels 45. This is of decided advantage in view of the fact that it has been fully established in practice that by having this increased speed of the wheels 45, the requisite gripping action of the coacting band 46 upon the wheel 45 can be obtained with a minimum of tension of the band 46, thereby reducing the wear upon said brake band and at the same time minimizing the heat generated by the frictional contact between the band 46 and the wheel 45.

It is to be understood that in practice the casing A is substantially filled with oil so that the parts arranged therein may operate to greater advantage.

Upon the starting of the motor, the shaft D rotates, and at which time the brake bands 46 are in neutral or release and as the shaft D rotates, the shaft S is caused to rotate at a lower speed in the same direction through the operative connection afforded by the housing or casing H and the gear assemblies carried thereby and coacting with the shafts D and S as hereinbefore set forth.

During this period, the clutching mechanism, comprising the band or brake sections 9 coacting with the annular flange 10, holds the casing or housing H against movement reverse to the direction of travel of the shaft S. As the speed of the motor increases dependent upon the load thereof, the shaft S will correspondingly increase in speed and as the casing B rotates with the shaft S, which occurs when the shaft S is running below high, the arms 51 will swing outwardly causing the various brake bands 46 to frictionally engage or grip their coacting wheels 45, whereby the casing or housing H will be caused to rotate in unison with the shafts D and S so that the speed of the driven shaft will be increased.

From the foregoing description it is thought to be obvious that a power transmission mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In a transmission mechanism, a driving shaft, a driven shaft, and means operatively connecting said shafts including a member loosely mounted on both of the shafts, a gear assembly carried by the member and coacting with the shafts, a gear carried by said member and concentric to the driving shaft, a gear fixed to the driving shaft, an element having rotary movement around the driven shaft independently thereof, an idle gear carried by said element and in driven connection with both of the last named gears, and clutching means carried by said element and coacting with the idle gear to retard the rotation of said idle gear about its axis.

2. In a transmission mechanism, a driving shaft, a driven shaft, and means operatively connecting said shafts including a member loosely mounted on both of the shafts, a gear assembly carried by the member and coacting with the shafts, a gear carried by said member and concentric to the driving shaft, a gear fixed to the driving shaft, an element having rotary movement around the driven shaft independently thereof, an idle gear carried by said element and in driven connection with both of the last named gears, and clutching means carried by said element and coacting with the idle gear to retard the rotation of said idle gear about its axis, said idle gear, when rotating about its axis, having a greater peripheral speed than the gears with which it engages.

3. In a transmission mechanism, a driving shaft, a driven shaft, and means operatively connecting said shafts including a member loosely mounted on both of the shafts, a gear assembly carried by the member and coacting with the shafts, a gear carried by said member and concentric to the driving shaft, a gear fixed to the driving shaft, an element having rotary movement around the driven shaft independently thereof, an idle gear carried by said element and in driven connection with both of the last named gears, clutching means carried by said element and coacting with the idle gear to retard the rotation of said idle gear about its axis, said idle gear, when rotating about its axis, having a greater peripheral speed than the gears with which it engages, and means for bringing the clutch into operative action upon the idle gear.

4. In a transmission mechanism, a driving shaft, a driven shaft, and means operatively connecting said shafts including a member loosely mounted on both of the shafts, a gear assembly carried by the member and coacting with the shafts, a gear carried by said member and concentric to the driving shaft, a gear fixed to the driving shaft, an element having rotary movement around the driven shaft independently thereof, an idle gear carried by said element and in driven connection with both of the last named gears, clutching means carried by said element and coacting with the idle gear to retard the rotation of said idle gear about its axis, and automatic means for bringing the clutch into operative action upon the idle gear.

5. In a transmission mechanism, a driving shaft, a driven shaft, and means operatively connecting said shafts including a member loosely mounted on both of the shafts, a gear assembly carried by the member and coacting with the shafts, a gear carried by said member and concentric to the driving shaft, a gear fixed to the driving shaft, an element having rotary movement around the driven shaft independently thereof, an idle gear carried by said element and in driven connection with both of the last named gears, clutching means carried by said element and coacting with the idle gear to retard the rotation of said idle gear about its axis, and means operable under centrifugal force for bringing the clutch into operative action upon the idle gear.

6. In a transmission mechanism, a driving shaft, a driven shaft, and means operatively connecting said shafts including a member loosely mounted on both of the shafts, a gear assembly carried by the member and coacting with the shafts, a gear carried by said member and concentric to the driving shaft, a gear fixed to the driving shaft, an element having rotary movement around the driven shaft independently thereof, a plurality of idle gears operatively connected with the last named gears and interposed therebetween, and clutching units carried by the element, said units being of a number equal to the number of idle gears, each of said units operating independently of the other.

7. In a transmission mechanism, a driving shaft, a driven shaft, and means operatively connecting said shafts including a member loosely mounted on both of the shafts, a gear assembly carried by the member and coacting with the shafts, a gear carried by said member and concentric to the driving shaft, a gear fixed to the driving shaft, an element having rotary movement around the driven shaft independently thereof, a plurality of idle gears operatively connected with the last named gears and interposed therebetween, and clutching units carried by the element, said units being of a number equal to the number of idle gears, each of said units operating independently of the other, each of said units in itself being insufficient to substantially retard the rotation of the idle gear with which it coacts.

In testimony whereof I hereunto affix my signature.

WILLIAM I. WHEELER.